March 27, 1928.  1,664,375
F. A. HOWARD
VALVE FOR INTERNAL COMBUSTION ENGINES
Filed Jan. 15, 1925    2 Sheets-Sheet 1

FRANK A. HOWARD  Inventor

March 27, 1928. 1,664,375
F. A. HOWARD
VALVE FOR INTERNAL COMBUSTION ENGINES
Filed Jan. 15, 1925  2 Sheets-Sheet 2

Frank A. Howard Inventor

By  Attorney

Patented Mar. 27, 1928.

1,664,375

UNITED STATES PATENT OFFICE.

FRANK A. HOWARD, OF ELIZABETH, NEW JERSEY, ASSIGNOR TO STANDARD OIL DEVELOPMENT COMPANY, A CORPORATION OF DELAWARE.

VALVE FOR INTERNAL-COMBUSTION ENGINES.

Application filed January 15, 1925. Serial No. 2,473.

My invention relates to improvements in internal combustion engines and more particularly to certain improvements in mechanical design of an engine built and operating according to the cycle described in the application of Wladimir Michael Zaikowsky Serial No. 714,263, of May 19th, 1924. The present invention will be fully understood from the following specification taken in connection with the appended drawings.

Figures 1, 2:
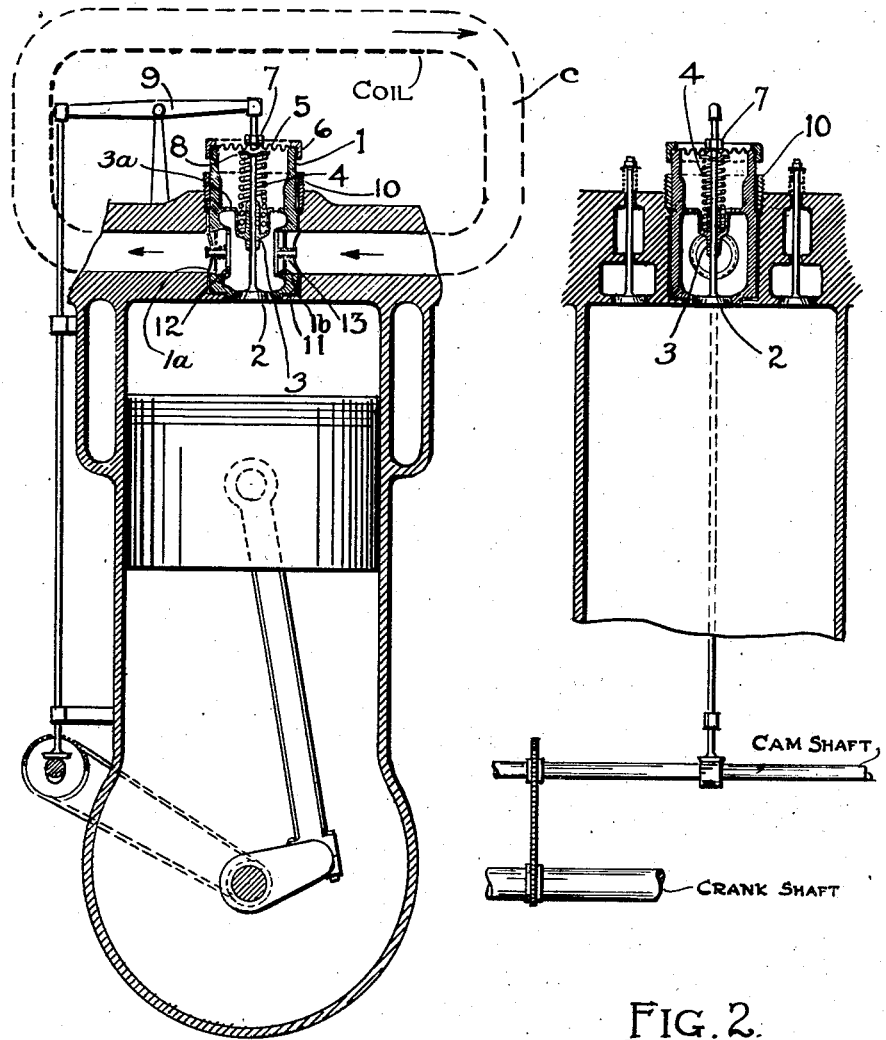
Figures 3, 4:
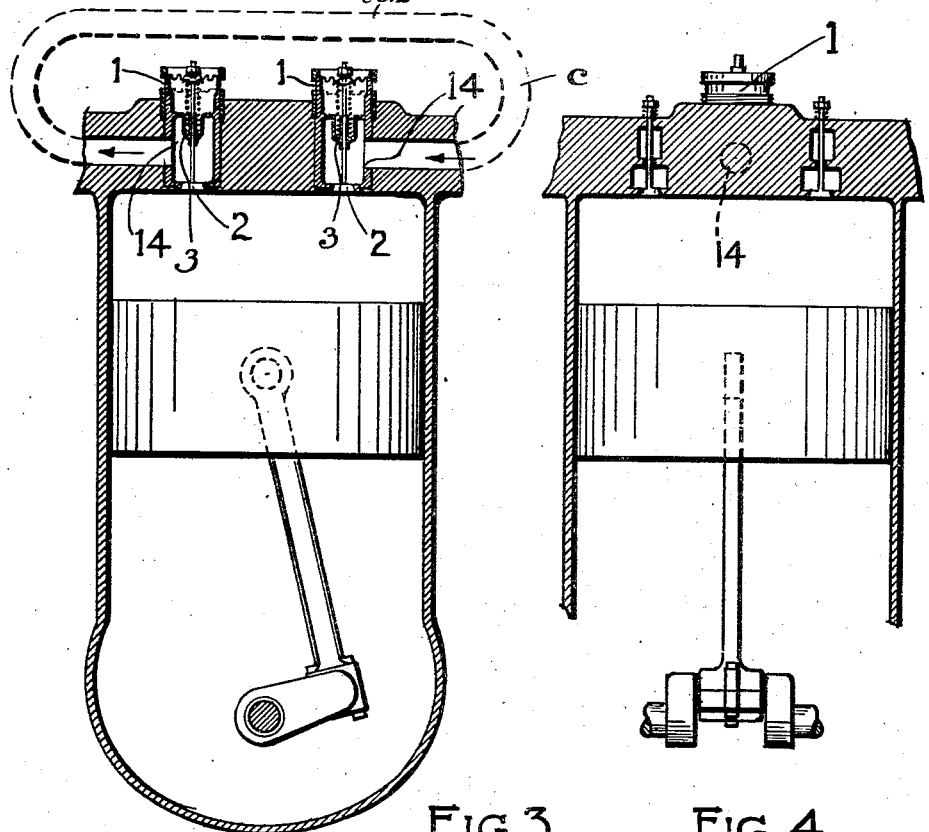
Figure 5:
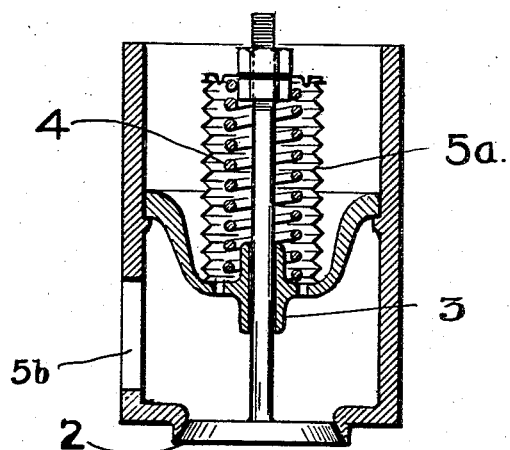

In these drawings, Figure 1 is a central vertical section thru a single cylinder internal combustion engine. Figure 2 is a partial vertical section thru a cylinder of the engine on a plane at right angles to the plane of Figure 1. Figures 3 and 4 are corresponding views of a modified design of engine employing separate inlet and outlet valves for the compression chamber, and Figure 5 is a section of a modified form of valve.

The engines illustrated in the drawings are of the conventional four-cycle, carbureting, electric-ignition type, such as are employed in automobiles of the present time. The description will therefore be confined to such parts as relate directly to the invention.

The purpose of the present invention is to provide improved valve mechanism for the operation of an engine according to the Zaikowsky cycle heretofore referred to.

In Figures 1 and 2, there is shown mounted centrally in the head of the engine a valve cage designated 1. Axially of this cage, there is arranged a poppet valve 2, the stem of which is guided by a support 3, which also serves as the bottom abutment for the valve spring 4. The top of the valve cage is closed by a corrugated flexible diaphragm, designated 5, which is fastened to the body of the cage by an annular nut 6. Support 3 is perforated as at 3ª. The stem of the valve is hermetically sealed into the center of the diaphragm, as by nut 7. The valve spring has the usual upper abutment in the form of a washer 8 locked on the valve stem. The valve stem is operated in the usual way thru a rocker arm 9. The valve cage is held in position in the head of the cylinder by an annular nut 10. The lower end of the valve cage has a gas-tight fit where it seats on the shoulder 11 against a corresponding shoulder formed in the cylinder head. The cage 1 has oppositely disposed openings 1ª and 1ᵇ in its sides at a point below the valve guide 3. One of these openings is equipped with an outwardly opening check-valve 12, and the other with an inwardly opening check-valve 13. The compression chamber C to which the check-valves furnish communication through openings 1ª and 1ᵇ is indicated diagrammatically by the dotted lines and the designation "Coil."

The valve cage 1 may be removed as a unit from the cylinder head, carrying with it the main poppet-valve 2 and the check-valves 12 and 13. This operation may be carried out by merely dismounting the operating rocker arm 9 and removing the annular nut 10. By the construction described, therefore, all the moving parts which constitute any portion of the valve mechanism required for the operation of the Zaikowsky cycle are included in a unitary construction, in the form of a conventional valve cage to which has been added the features necessary to adapt it for this service, i. e., the check-valves 12 and 13 and the diaphragm 5.

It will be noted that the cross-sectional area of the diaphragm 5 is considerably greater than that of the valve 2. The diaphragm 5 forms the top of a gas-tight chamber which is exposed to the pressure in the coil through openings 3ª. By reason of this construction, the pressure existing in the compression chamber, and which would normally tend to open the valve 2 on all strokes save the working stroke of the engine, is balanced by the pressure on the inner face of the diaphragm 5. At the same time, the diaphragm, to which the valve stem is hermetically sealed, prevents all leakage of the compressed charge to the atmosphere.

In Figure 2, the normal inlet and exhaust valves of the engine are shown as located on either side of the compression chamber valve 2. This arrangement is illustrated merely for the sake of simplicity. Any desired mounting or location of the three valves required for the operation of the engine may obviously be made.

In Figures 3 and 4, I have illustrated a modification of the valve cage construction shown in Figures 1 and 2. In this modification, the construction of the cage is identical except for the fact that in this instance there are two compression chamber valves employed, in place of a single valve, and by this duplication of the valves I am able to dispense with the check-valves 12 and 13, the valve cage 1, in lieu thereof, in each instance being provided with a single open port 14, which registers with a corresponding port in the cylinder head.

The operation of the device shown in Figures 1 and 2 is as follows: On the compression stroke of the engine, the valve 2 is opened at a point, which may, for example, be 60° past bottom dead center, and remains open until 20° ahead of top dead center, assuming that ignition takes place at approximately 15° ahead of top dead center. During the normal operation of the engine, immediately upon the opening of the valve 2, a previously compressed and cooled portion of the combustible charge will flow into the engine from the compression chamber. This flow into the chamber will be from the right-hand side of the drawing, as indicated by the arrow thereon. As soon as equality of pressure has established itself between the compression chamber and the cylinder, the continued movement of the piston will reverse the direction of flow of the combustible mixture thru the valve 2, and for the remainder of the opening of the valve the compressed charge will be forced outwardly thru the check-valve and into the opposite end of the coil form of compression chamber, that is, into the left-hand end of the coil as shown in Figure 1 and indicated by the arrow thereon. At the time of closing of valve 2, the pressure in the compression chamber, which is in this instance in the form of a coil, as shown, will have returned to the original maximum figure corresponding to the position of the piston at the time of the closing of the valve 2.

It will be noted in the construction herein described that there is a minimum length of common passage for the incoming and outgoing compressed charge, that is, the interior of the valve cage 1 below the valve guide 3 constitutes the entire length of this common passage. The construction described, therefore, meets this theoretical requirement, and, as a result, will give a maximum efficiency of cooling of the compressed charge in the compression chamber, the reheating of the charge by exposure to heated surfaces on its way back into the cylinder being minimized.

In the construction shown in Figures 3 and 4, the advantage last referred to, i. e., the avoidance of a common passage for the incoming and outgoing charges, is obtained by utilizing separate and distinct compression valves for the two ends of the compression chamber coil. Thus, in this instance, the left-hand valve 1 shown in Figure 3 admits the mixture from the cylinder into the coil, as shown by the arrow, while the right-hand valve admits the cooled compressed charge from the coil back into the cylinder. These valves are designed to be independently operated, each by its own cam and rocker arm, in the usual manner. An example of proper valve timing for an arrangement such as that shown in Figure 3 is as follows: At a point 60° up on the compression stroke, that is, 60° beyond bottom dead center, the right-hand compression valve is opened and remains open for a total of 25° movement of the crank, at which time the right-hand valve closes and the left-hand valve simultaneously opens, remaining open for the ensuing 75°, that is, instead of having a single valve open for a total angle of 100°, as described in connection with Figure 1, the construction shown in Figures 3 and 4 divides the two functions of the compression chamber valve, providing a separate valve for each function, the valve by which the charge enters the cylinder remaining open for 25°, and the valve by which it leaves the cylinder remaining open for 75°.

It will be understood that these valve timings are by way of example only, and that the optimum timing in any individual instance will depend upon the characteristics of the engine and of the compression chamber and upon the size and speed of opening and closing of the valves.

In Figure 5 I have illustrated a modified valve construction in which the corrugated diaphragm is replaced by a corrugated cylinder, designated 5ª, the upper head of which forms the upper abutment for the valve spring 4. The cylinder serves as a means for balancing the pressure on the inside face of the poppet valve 2. Any suitable type of expansible, movable, or diaphragm member may be used in the combination described. Instead of a single port 5ᵇ, as shown, two or more ports for communication with the compression chamber C may be provided in the device of Figure 5.

Various modifications and alternative arrangements may be made within the scope of the appended claims in which it is my intention to claim all novelty inherent in the invention as broadly as the state of the art permits.

I claim:

1. In combination with an internal combustion engine having a compression chamber connected therewith, a valve for controlling communication between the compression chamber and a cylinder of the engine, a pressure-responsive member connected to the valve, said member being exposed to the pressure in the compression chamber and tending to counteract the effect of such pressure on the valve, and means actuated by the engine for opening the valve on the compression stroke.

2. In combination with an internal combustion engine having a compression chamber connected therewith, a valve for controlling communication between the compression chamber and a cylinder of the engine, an expansible member exposed to the pressure in the compression chamber, said valve being of the poppet type and having its stem hermetically sealed in the expansible member, and means for hermetically sealing the outer edge of said member, whereby leakage of the compressed charge is prevented.

3. In combination with an internal combustion engine having an elongated compression chamber connected at its ends to a cylinder of the engine, a unitary valve assembly for controlling communication between the engine and the compression chamber, and comprising a cage, a poppet-valve guided therein and closing a port at the bottom of the cage, and inwardly and outwardly opening check-valves mounted in the said cage and controlling ports which register respectively with the ends of the said compression chamber.

4. A compression chamber valve for an internal combustion engine, comprising in combination a cage, a valve seating at one end of the cage, a pressure-responsive member connected to the valve and adapted to counteract the effect of pressure thereon, and a check valve controlling a port in the side wall of the cage.

5. A compression chamber valve for an internal combustion engine comprising in combination a cage, a poppet-valve centrally located therein and seating at one end of the cage, a flexible diaphragm closing the opposite end of the cage, a spring mounted within the cage and holding the valve normally closed, and inwardly and outwardly opening check-valves controlling separate ports in the side walls of the cage.

6. The combination with an internal combustion engine, of an elongated compression chamber having its two ends connected with the cylinder of the engine, and valve means operable from the engine crankshaft for controlling communication between each end of said passage and the engine cylinder.

7. The combination with an internal combustion engine, of an elongated compression chamber having its two ends connected with the cylinder of the engine, valve means operable from the engine crankshaft for controlling communication between each end of said chamber and the engine cylinder, and expansible members connected to said valve means, said members being exposed to the pressure in the compression chamber and adapted to counteract the effect of such pressure on the valve means.

FRANK A. HOWARD.